United States Patent Office 2,842,566
Patented July 8, 1958

2,842,566
6-METHYL, Δ$^{1,4}$, 3 KETO ANDROSTENE DERIVATIVES

Jean P. Rosselet, Kalamazoo, Mich., assignor to The Upjohn Company, Kalamazoo, Mich., a corporation of Michigan No Drawing. Application December 11, 1957
Serial No. 701,986

7 Claims. (Cl. 260—397.3)

The present invention relates to steroid compounds and is particularly concerned with 1-dehydro-6-methyltestosterone and the 17-esters thereof and 1-dehydro-6-methyl-adrenosterone.

The new compounds and the process of the present invention are illustratively represented by the following formulae:

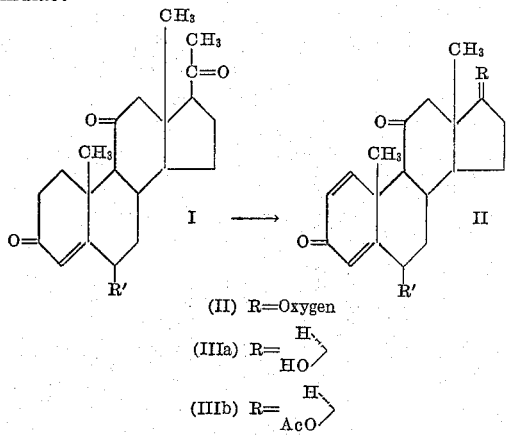

(II) R=Oxygen (IIIa) R= 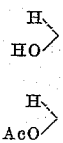 H, HO (IIIb) R= H, AcO wherein R is selected from the substituents consisting of keto oxygen;

H, HO and

H, AcO wherein Ac is the acyl radical of a hydrocarbon carboxylic acid containing from one to twelve carbon atoms, inclusive, and R' is selected from the group consisting of 6α-methyl and 6β-methyl.

The process of the instant invention comprises submitting 6-methyl-11-ketoprogesterone (I) to the fermentative action of an organism of a species of the genus Septomyxa to give simultaneously 1-dehydro-6-methyladrenosterone and 1-dehydro-6-methyl-11-ketotestosterone (IIIa). From 1-dehydro-6-methyl-11-ketotestosterone by oxidation with chromic acid the 1-dehydro-6-methyladrenosterone (II) can be obtained. By esterifying in conventional manner 1-dehydro-6-methyl-11-ketotestosterone with acid anhydrides, acid halides, such as an acyl chloride, acyl bromide; or ketenes and isopropenyl acylates, the corresponding 17-ester of 1-dehydro-6-methyl-11-ketotestosterone (IIIb) is obtained. Details of these reactions are shown in the examples.

It is an object of the instant invention to provide 1-dehydro-6-methyladrenosterone, 1-dehydro-6-methyl-11-ketotestosterone and the 17-esters thereof as well as methods for the production therefor, especially in the α-epimeric form, i. e. 1-dehydro-6α-methyladrenosterone and 1-dehydro-6α-methyl-11-ketotestosterone and the 17-esters thereof.

The new compounds 1-dehydro-6-methyladrenosterone, and 1-dehydro-6-methyl-11-ketotestosterones and the 17-esters especially as 6α-methyl epimers thereof have gonadotropin inhibition and particularly inhibit the follicle stimulating hormone (FSH). The compound is therefore useful in preventing estrus in dogs and other mammals, as oral contraceptives, or in the treatment of nymphomania, dysmenorrhea or any imbalance between the follicle stimulating hormone and the luteinising hormone.

The following examples are illustrative of the process and product of the present invention, but are not to be construed as limiting.

EXAMPLE 1

*1-dehydro-6α-methyladrenosterone and 1-dehydro-6α-methyl-11-ketotestosterone*

Ten liters of a medium consisting of one percent Cerelose dextrose, two percent corn steep liquor containing sixty percent solids, was adjusted to pH 4.85 with sodium hydroxide. Ten milliliters of lard oil containing 0.1 to 2.0 percent octadecanol was added to prevent foaming. The medium was steam sterilized. Upon cooling, the sterile medium was inoculated with 500 milliliters of a nineteen hour growth from spores of *Septomyxa affinis* ATCC 6737. The medium was agitated (300 R. P. M.) and sparged with sterile air at the rate of 0.1 liter of air per minute. After culturing for 24 hours there was added four grams of 6α-methyl-11-ketoprogesterone [G. B. Spero et al., J. Am. Chem. Soc. 78, 6213 (1956)], dissolved in 35 milliliters of acetone. Fermentation of the substrate was maintained for 24 hours at which time the pH was 7.15. The fermentation broth was then filtered to separate the mycelium. The mycelium was washed once with one liter of acetone and then twice with one-liter portions of methylene chloride. The acetone and methylene chloride washings were combined with an additional four liters of methylene chloride and this seven liters of extract and solvent was then used to extract the filtered beer. Upon separation of the extract from the beer, the beer was twice more extracted with three-liter volumes of methylene chloride. All of the acetone and methylene chloride extracts were combined and washed with 1200 milliliters of two percent sodium bicarbonate solution, and then with 1200 milliliters of water. The washed solvent extract was then dried with anhydrous sodium sulfate and vacuum-evaporated to leave 5.2 grams of dry extracts.

The extracts were dissolved in 120 milliliters of benzene and fractionated over a column of 200 grams of alumina (acid washed, dried at 120 degrees centigrade) using 120 milliliter portions of developing solvent as shown in Table I.

TABLE I

| Fraction No. | Solvent | Residue in Milligrams |
|---|---|---|
| 1-2 | benzene | discarded |
| 3 | benzene:ether 3:1 | 160 |
| 4 | do | 320 |
| 5 | benzene:ether 1:1 | 548 |
| 6 | do | 456 |
| 7 | ether | 192 |
| 8 | do | 357 |
| 9 | do | 358 |
| 10 | do | 292 |
| 11 | ether-chloroform 19:1 | 265 |
| 12 | do | 194 |
| 13 | ether-chloroform 9:1 | 157 |
| 14 | do | 131 |
| 15 | ether-chloroform 3:1 | 42 |
| 16 | do | 25 |
| 17 | ether-chloroform 1:1 | 15 |
| 18 | do | 10 |
| 19 | chloroform | 8 |
| 20 | do | 4 |
| 21 | chloroform-methanol 1:1 | 1 |
| 22 | do | 944 |
| 23-25 | methanol | 107 |

Fractions four, five and six were combined and recrystallized from hot benzene to give 353 milligrams of 1-dehydro-6α-methyladrenosterone of melting point 274 to 276 degrees centigrade with decomposition and rotation [α]$_D$ of plus 230 degrees in chloroform.

*Analysis.*—Calcd. for $C_{20}H_{24}O_3$: C, 76.89; H, 7.74. Found: C, 76.67; H, 7.94.

Thereafter fractions nine through fourteen were combined and twice recrystallized from methanol chloride ether to give 980 milligrams of crystals of 1-dehydro-6α-methyl-11-ketotestosterone of melting point 209 to 210 degrees centigrade and rotation [α]$_D$ of plus 148 degrees in chloroform.

*Analysis.*—Calcd. for $C_{20}H_{26}O_3$: C, 76.40; H, 8.34. Found: C, 76.42; H, 8.30.

In the same manner, using 6β-methyl-11-ketoprogesterone as starting material, the above fermentation is productive of a mixture of 1-dehydro-6β-methyladrenosterone and 1-dehydro-6β-methyl-11-ketotestosterone.

EXAMPLE 2

*1-dehydro-6α-methyladrenosterone from 1-dehydro-6α-methyl-11-ketotestosterone*

To 100 milligrams of 1-dehydro-6α-methyl-11-ketotestosterone, dissolved in glacial acetic acid, was added forty milligrams of chromium oxide in two milliliters of glacial acetic acid. The mixture was kept at room temperature for sixteen hours, then diluted with four milliliters of methanol. After two hours at room temperature, the mixture was evaporated to dryness in vacuo, the residue thus obtained dissolved in methylene chloride, decolorized with carbon, filtered and evaporated to dryness. The residue, 89 milligrams, gave upon crystallization from acetone-ether 64 milligrams of colorless needles of melting point 264 to 270 degrees centigrade. This melting point was not depressed when the substance was mixed with 1-dehydro-6α-methyladrenosterone, as obtained from the fermentation in Example 1.

EXAMPLE 3

*1-dehydro-6α-methyl-11-ketotestosterone 17-acetate*

A mixture was prepared containing in one milliliter of pyridine 100 milligrams of 1-dehydro-6α-methyl-11-ketotestosterone. To this solution was added one milliliter of acetic anhydride. The mixture was allowed to stand at room temperature for a period of four hours and was thereupon diluted with twenty milliliters of water. The aqueous mixture was then cooled overnight to about zero to five degrees centigrade and filtered thereafter. The precipitate obtained from the filtration was twice recrystallized from methylene chloride and ether to give 1-dehydro-6α-methyl-11-ketotestosterone 17-acetate.

EXAMPLE 4

*1-dehydro-6α-methyl-11-ketotestosterone 17-benzoate*

A mixture was prepared containing in one milliliter of pyridine and one milliliter of benzoyl chloride 0.1 gram of 1-dehydro-6α-methyl-11-ketotestosterone. This mixture was allowed to stand for eighteen hours overnight, was thereupon diluted with fifty milliliters of water and refrigerated to about five degrees centigrade. Thereafter the mixture was extracted with two 25-milliliter portions of methylene chloride, the methylene chloride extracts were washed twice with water, dried over anhydrous sodium sulfate and evaporated. The solid was three times recrystallized from methanol to give 1-dehydro-6α-methyl-11-ketotestosterone 17-benzoate.

EXAMPLE 5

*1-dehydro-6α-methyl-11-ketotestosterone 17-propionate*

In the same manner as shown in Example 3, treating 1-dehydro-6α-methyl-11-ketotestosterone at room temperature in pyridine solution with propionic anhydride results in 1-dehydro-6α-methyl-11-ketotestosterone 17-propionate, a light colored crystalline solid.

EXAMPLE 6

*1-dehydro-6α-methyl-11-ketotestosterone 17-laurate*

In the same manner as shown in Example 3, treating 1-dehydro-6α-methyl-11-ketotestosterone at room temperature in pyridine solution with lauric anhydride results in 1-dehydro-6α-methyl-11-ketotestosterone 17-laurate.

EXAMPLE 7

*1-dehydro-6α-methyl-11-ketotestosterone 17-trimethylacetate*

In the same manner as shown in Example 3, treating 1-dehydro-6α-methyl-11-ketotestosterone at room temperature in pyridine solution with trimethylacetic anhydride results in 1-dehydro-6α-methyl-11-ketotestosterone 17-trimethylacetate, a light colored crystalline solid.

EXAMPLE 8

*1-dehydro-6α-methyl-11-ketotestosterone 17-cyclohexanecarboxylate*

In the same manner as shown in Example 3, treating 1-dehydro-6α-methyl-11-ketotestosterone at room temperature in pyridine solution with cyclohexanecarboxylic anhydride results in 1-dehydro-6α-methyl-11-ketotestosterone 17-cyclohexanecarboxylate.

EXAMPLE 9

*1-dehydro-6α-methyl-11-ketotestosterone 17-phenylacetate*

In the same manner as shown in Example 3, treating 1-dehydro-6α-methyl-11-ketotestosterone at room temperature in pyridine solution with phenylacetic anhydride results in 1-dehydro-6α-methyl-11-ketotestosterone 17-phenylacetate.

EXAMPLE 10

*1-dehydro-6α-methyl-11-ketotestosterone 17-phenylpropionate*

In the same manner as shown in Example 3, treating 1-dehydro-6α-methyl-11-ketotestosterone at room temperature in pyridine solution with phenylpropionic anhydride results in 1-dehydro-6α-methyl-11-ketotestosterone 17-phenylpropionate.

EXAMPLE 11

*1-dehydro-6α-methyl-11-ketotestosterone 17-acrylate*

In the same manner as shown in Example 3, treating 1-dehydro-6α-methyl-11-ketotestosterone at room temperature in pyridine solution with acrylic anhydride results in 1-dehydro-6α-methyl-11-ketotestosterone 17-acrylate.

EXAMPLE 12

*1-dehydro-6α-methyl-11-ketotestosterone 17-hemisuccinate*

In the same manner as shown in Example 1, treating 1-dehydro-6α-methyl-11-ketotestosterone at room temperature in pyridine solution with succinic anhydride results in 1-dehydro-6α-methyl-11-ketotestosterone 17-hemisuccinate, a light colored crystalline solid, which can be converted in aqueous alcoholic solution to its sodium salt by the action of a sodium base such as sodium carbonate.

In the same manner as shown in Examples 3 through 12, inclusive, other 17-esters of 1-dehydro-6α-methyl-11-ketotestosterone are prepared by reacting the corresponding acyl halides or acid anhydrides with 1-dehydro-6α-methyl-11-ketotestosterone. Esters thus prepared include the 17-butyrate, valerate, hexanoate, isobutyrate, isovalerate, cyclohexylacetate, adipate, crotonate, undecylenate, propiolate, undecolate, cinnamate ester of 1-dehydro-6α-methyl-11-ketotestosterone.

Using as the starting material for the esterification the 1-dehydro-6β-methyl-11-ketotestosterone results in the corresponding 1-dehydro-6β-methyl-11-ketotestosterone 17-acylates, such as the 17-acetate, propionate, benzoate, phenylacetate, phenylpropionate of 1-dehydro-6β-methyl-11-ketotestosterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound of the formula:

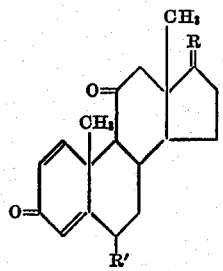

wherein R is selected from the substituents consisting of keto oxygen

and

wherein Ac is the acyl radical of a hydrocarbon carboxylic acid containing from one to twelve carbon atoms, inclusive, and R' is selected from the group consisting of 6α-methyl and 6β-methyl.

2. 1-dehydro-6α-methyladrenosterone.
3. 1-dehydro-6a-methyl-11-ketotestosterone.
4. 1-dehydro-6a-methyl-11-ketotestosterone 17-acylate wherein the acyl group is of a hydrocarbon carboxylic acid containing from one to twelve carbon atoms, inclusive.
5. 1-dehydro-6α-methyl-11-ketotestosterone 17-acetate.
6. 1-dehydro-6α-methyl-11-ketotestosterone 17-benzoate.
7. 1-dehydro-6α-methyl-11-ketotestosterone 17-hemisuccinate and its sodium salt.

References Cited in the file of this patent
UNITED STATES PATENTS
2,783,226   Gould _____ Feb. 26, 1957

OTHER REFERENCES
Ringold et al.: J. Org. Chem., February 1956, vol. 21, pages 239, 240.

UNITED STATES PATENT OFFICE
CERTIFICATE OF CORRECTION

Patent No. 2,842,566                                                         July 8, 1958

Jean P. Rosselet

It is hereby certified that error appears in the printed specification of the above numbered patent requiring correction and that the said Letters Patent should read as corrected below.

Column 5, lines 27 to 30, for $$\begin{array}{c}H\\HO\end{array}\!\!\!> \quad \text{read} \quad \begin{array}{c}H\\HO\end{array}\!\!\!>$$

Signed and sealed this 19th day of May 1959.

(SEAL)
Attest:

KARL H. AXLINE                                                         ROBERT C. WATSON
Attesting Officer                                             Commissioner of Patents